United States Patent
Kim et al.

(10) Patent No.: US 6,880,103 B2
(45) Date of Patent: Apr. 12, 2005

(54) METHOD AND APPARATUS FOR RADIO PACKET DATA TRANSMISSION

(75) Inventors: Young Hwan Kim, Kyungki-Do (KR); Doo Young Moon, Seoul (KR); Kyung Kuk Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 574 days.

(21) Appl. No.: 09/986,415

(22) Filed: Nov. 8, 2001

(65) Prior Publication Data

US 2002/0056055 A1 May 9, 2002

(30) Foreign Application Priority Data

Nov. 9, 2000 (KR) ........................................ 2000-66326

(51) Int. Cl.$^7$ ............................................... G06F 11/00
(52) U.S. Cl. ......................... 714/18; 714/47; 714/748; 370/320; 370/335; 370/341; 370/342
(58) Field of Search ........................... 714/18, 47, 748; 370/320, 335, 341–342

(56) References Cited

U.S. PATENT DOCUMENTS

| | | | | |
|---|---|---|---|---|
| 5,230,082 A | * | 7/1993 | Ghisler et al. | 455/438 |
| 6,072,994 A | * | 6/2000 | Phillips et al. | 455/84 |
| 6,269,088 B1 | * | 7/2001 | Masui et al. | 370/335 |
| 6,480,525 B1 | * | 11/2002 | Parsa et al. | 375/141 |
| 6,574,267 B1 | * | 6/2003 | Kanterakis et al. | 375/141 |
| 6,643,318 B1 | * | 11/2003 | Parsa et al. | 375/141 |

* cited by examiner

Primary Examiner—Nadeem Iqbal
Assistant Examiner—Emerson Puente
(74) Attorney, Agent, or Firm—Fleshner & Kim, LLP (57) ABSTRACT

A method and device for communicating data within a packet frame unit between a terminal and a base station are disclosed. The terminal communicates the packet data to the base station. In response, the base station transmits a channel occupying signal, if the data transmission from the terminal is perceived by the base station. The terminal continues the communication of the packet data, while the channel occupying signal is active, determines whether the base station receives the communicated packet data, and ends the process for communicating the packet data if the base station receives the communicated packet data. If the base station fails to receive the communicated packet data, the terminal is informed through the channel occupying signal. Thereafter, the terminal discontinues its communication and then re-attempts to communicate the packet data from the beginning.

34 Claims, 9 Drawing Sheets

METHOD AND APPARATUS FOR RADIO PACKET DATA TRANSMISSION

BACKGROUND OF THE INVENTION

1. Field of the Invention

The present invention relates to a transmission of radio packet data and, more particularly, to an apparatus and a method for radio packet data transmission.

2. Background of the Related Art

A radio packet data transmission system is a system that transmits packet data by assigning a channel or time slot to respective subscriber terminals, which are connected to the system. In addition, a plurality of subscribers are able to communicate at high speed using a limited number of channels. A radio communication system using a frequency source should provide fast communication service to many subscribers using limited frequency channels.

A radio communication system may use either a circuit method or a packet method for communicating information. The circuit method is a method of assigning a channel to a respective subscriber. Therefore, if there are many subscribers, a plurality of channels should be secured. That is, a plurality of subscribers are not able to be accepted at the same time, because of the limited frequency source. If a subscriber spends more time on pause or on waiting than that spent on data transmission, while occupying a channel, the utility of the channel is lowered.

The packet method is a method by which a plurality of subscribers can communicate at the same time using a channel, whereby the utility of the radio channel source can be highly increased. And this method may be adopted as a standard method of the Third Generation Partnership Project (3GPP), that is, radio communication of the next generation.

Figure 1:
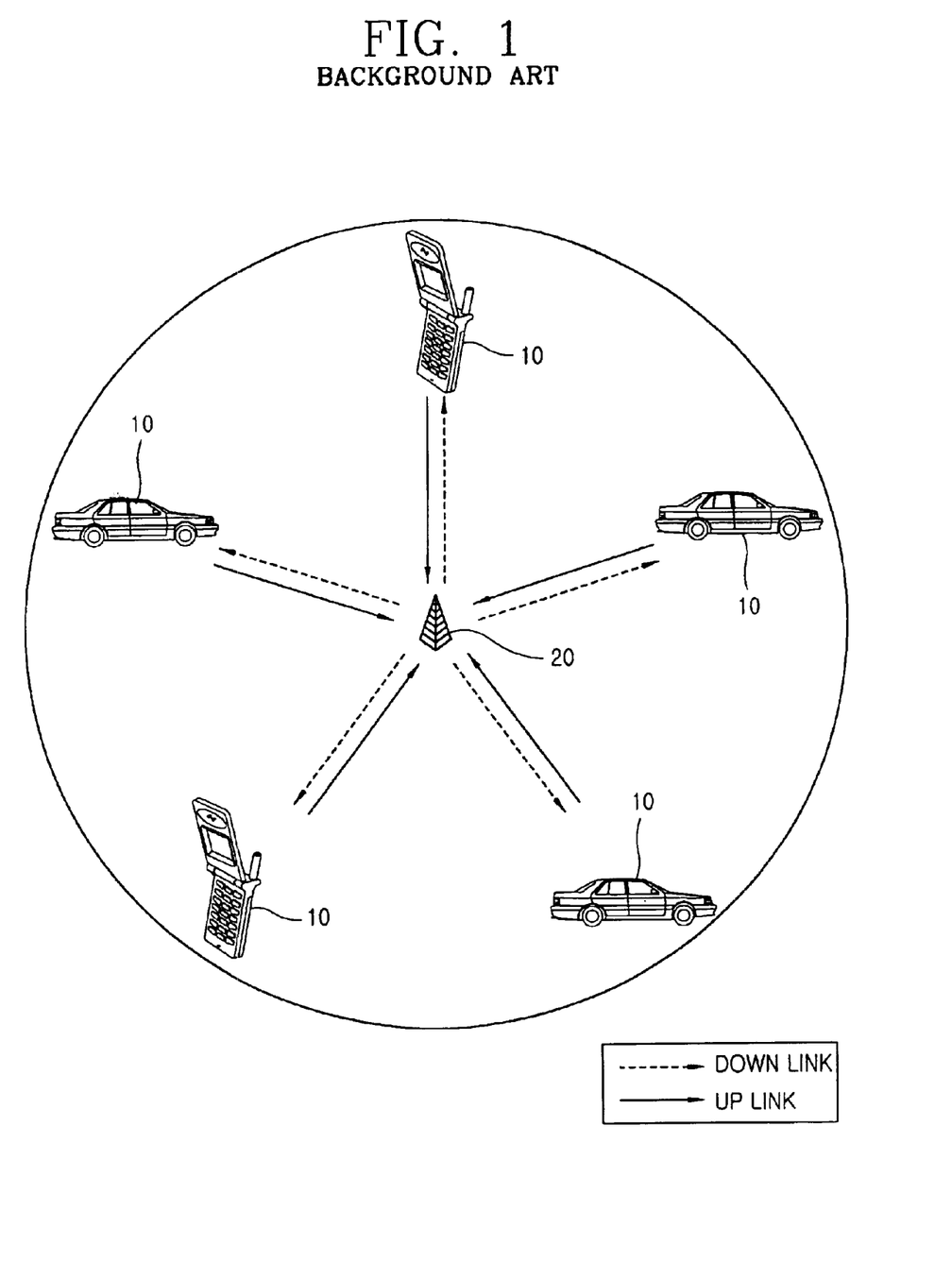
FIG. 1 illustrates a block diagram of a general cell in a mobile communication system.

A background art method for radio packet data transmission will be described with reference to the drawings. FIG. 1 is a block diagram of a general cell in a mobile communication system. The cell is an area in which communication service is provided by a base station of a mobile communication system. The cell includes a plurality of terminals 10 and a base station 20.

Figure 2:
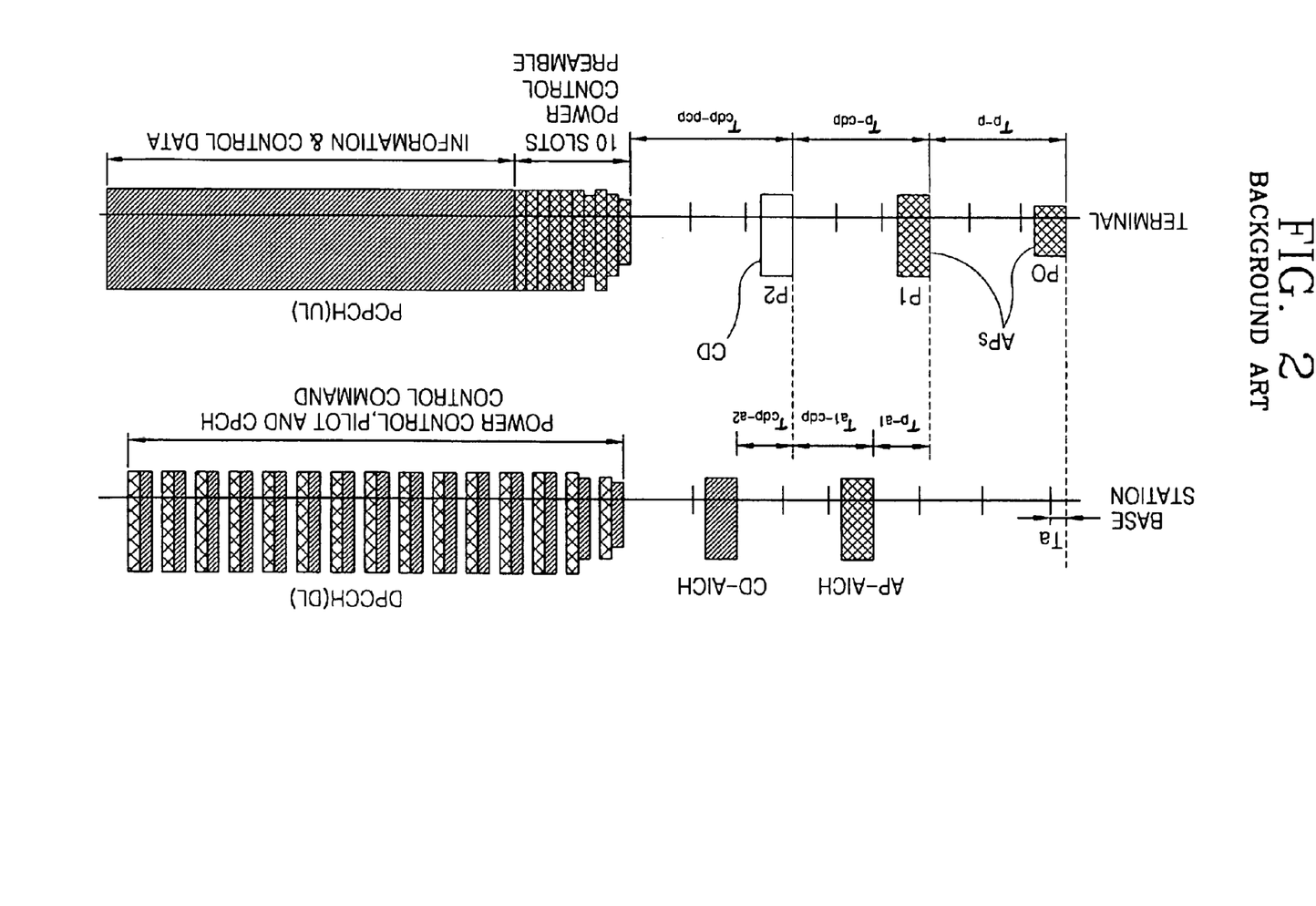
FIG. 2 illustrates a conceptional view of a background art packet data transmission method suggested by 3GPP.

FIG. 2 is a conceptional view showing a background art method for packet data transmission suggested by the 3GPP. A terminal 10 should connect to the base station 20 and then should be assigned a channel from the base station in order to communicate with other terminals or with a general wired subscriber. In addition, the terminal transmits the packet data through the assigned channel. The process will be described in more detail as follows.

The terminal 10 transmits an access preamble to the base station 20 with a certain electric power on a position P0. If the base station can not receive the access preamble transmitted by the terminal 10 on the position P0, the base station 20 does not generate an Access Preamble-Acquisition Indicator Channel-acknowledge (AP-AICH) response signal.

In addition, after a certain time $\tau_{p-p}$ has passed, the terminal 10 transmits the access preamble again but on the position P1. The access preamble, which is transmitted from the position P1, is transmitted with a certain increased electric power over that of the access preamble transmitted from the position P0.

The timing interval $\tau_{p-p}$ between transmitting the access preamble at the P0 and P1 respective power levels is calculated as follows.

Minimum $\tau_{p-p}$=15,360 chips+5,120 chips*constant(Tcpch)

Maximum $\tau_{p-p}$=5,120 chips*12=61,440 chips

The time unit of the chip is decided by a bandwidth of spread frequency. The constant Tcpch is a timing parameter decided in an upper layer of the corresponding protocol.

The access preamble transmitted with the power associated with position P1 is transmitted with increased electric power over that of the access preamble transmitted from the position P0. When the base station 20 receives the access preamble, it transmits a response signal AP-AICH to the terminal 10.

The response signal AP-AICH is transmitted within a period of time $\tau_{p-a1}$, from the time the access preamble of position P1 is transmitted, and costs 7,680 chips of time or 12,800 chips of time. In addition, the time is decided by the constant Tcpch.

After the terminal 10 receives the AP-AICH signal from the base station 20, the terminal 10 transmits a Collision Detection (CD) preamble using a power setting on a position associated with P2. The CD preamble is transmitted to the base station 20 within a time period $\tau_{p-cdp}$ from the beginning of the access preamble that is transmitted at the power level associated with position P1. The CD preamble is for preventing a crash, which may be generated when a plurality of terminals request an assignment for the same channel at the same time. In addition, the $\tau_{p-cdp}$ time is decided by the constant Tcpch, corresponds to 3 or 4 access slots, and costs at least 7,680 chips of time.

After the base station 20 receives the CD preamble, it begins transmitting a Collision Detection-Acquisition Indication Channel Acknowledge (CD-AICH) response signal within a period of time $\tau_{cdp-a2}$ since the transmission of the CD preamble began. The period $\tau_{cdp-a2}$ is also decided by the constant Tcpch and is 7,680 chips or 12,800 chips.

The terminal 10 that receives the CD-AICH signal begins transmitting a packet preamble, which is an electric power controlling signal, to the base station within a period of time $\tau_{cdp-pcp}$ since the CD preamble transmission began. The base station 20 controls a Transmit Power Control (TPC) of a Dedicated Physical Control Channel (Down Link) (DPCCH (DL)) using a closed loop power control method for about 10 ms. The $\tau_{cdp-pcp}$ time is decided by the constant Tcpch and corresponds to 3 or 4 access slots.

The base station 20 that receives the packet preamble periodically transmits an electric power controlling signal, a pilot, and a CPCH controlling signal through the DPCCH of the down link to the terminal 10. The terminal 10 that receives the signals performs an electric level controlling process for about 10 ms. In addition, the terminal 10 transmits a data unit signal, a Cyclic Redundancy Check (CRC) unit signal, and a postamble unit signal through a Physical Common Packet Channel (Up Link) (PCPCH) to the base station 20.

On the other hand, the base station 20 controls a transmission electric power by transmitting electric power signals to the terminal 10 periodically, while the terminal 10 transmits the data.

The time spent on pre-processing the packet data transmission according to the method suggested by the 3GPP is calculated as follows.

T minimum=$\tau_{p-p}$+$\tau_{p-cdp}$+$\tau_{cdp-pcp}$+packet preamble transmission time (10 ms)

According to experimental results calculated in accordance with the above-listed equation, the packet data transmission method suggested by the 3GPP needs at least 22.5 ms of pre-processing time. Also, after the pre-processing data is transmitted, an error in the transmitted data can only be identified after the data transmission is finished.

Therefore, if there is an error, the whole process should be performed again.

Also, a Common Packet Channel (CPCH) method of 3GPP, which is decided by the ESTI, ARIB/TTC, TI, and TTA in order to set detailed standards for the background art third generation GMS network, the W-CDMA connecting technique, and for the terminal, has problems that data crashes are increased if there are many subscribers who are assigned a certain channel. Additionally, the data transmission process is complex and it is difficult to transmit the data at high speed because overhead data, which control the respective packets, are large.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide an apparatus and a method for radio packet data transmission by which the pre-processing time of packet data transmission can be reduced.

Another object of the present invention is to deal with an error that may be generated while transmitting the data quickly.

To achieve the objects of the present invention in whole or in part, as embodied and broadly described herein, there is provided a terminal having an Intermediate Frequency/Radio Frequency (IF/RF) unit for changing a high frequency signal transmitted from a base station to a baseband signal and for transmitting the signal to a receive unit, a receive unit for extracting a data signal from the transmitted baseband signal and for applying it to a data matching unit, a data matching unit for matching the data inputted/outputted between the terminal and an outer processing device, a controlling channel supervising unit for controlling the transmission electric power of the terminal by extracting a controlling signal from the baseband signal transmitted from the IF/RF unit to the receive unit, and for supervising channel occupying status, a starting point controlling unit for deciding a point of data transmission and applying the corresponding controlling signal to a sending unit; and a sending unit for outputting the data applied from the data matching unit to the IF/RF unit.

In addition, there is provided a base station having an IF/RF unit for changing a high frequency signal transmitted from the terminal into a baseband signal and for transmitting the signal to a receive unit, a receive unit for extracting a data signal from the transmitted baseband signal and outputting it through a data matching unit and an error detecting unit, an initial synchronizing unit for detecting a phasing of data from the baseband signal transmitted from the IF/RF unit to the receive unit and for applying the corresponding electric power controlling signal to a sending unit after measuring the transmission electric power of the terminal, a data matching unit for matching data inputted/outputted between the base station and an outer data processing unit, an error detecting unit for detecting an error in a data signal inputted from the receive unit and for applying a corresponding error controlling signal to the sending unit, and a sending unit for outputting the data applied from the data matching unit to the lF/RF unit.

Also, there is provided a method for radio packet data transmission that includes accessing the base station to transmit packet data of a frame unit to the base station, transmitting a channel occupying signal to the terminal when the data transmission of the terminal is detected, maintaining the transmission of the packet data, which is presently transmitted when the channel occupying signal is transmitted from the base station, identifying whether there is an error or not in the transmitted data, and ending the data transmission process if there is no error in the transmitted data.

The objects of the invention may be further achieved in whole or in part by a communication terminal, including a variable power transmission means for communicating transmit data, a receiving means for communicating received data, and a signal detection means for detecting a busy signal and an idle signal within the received data. The signal detection means controls the variable power transmission means' power output, transmission timing, and ability to complete a communication of the transmit data, in response to the detected busy and idle signals.

The objects of the invention may be further achieved in whole or in part by a communication terminal, including a transmission means for communicating transmit data, a receiving means for communicating received data, and a signal detection means for detecting a quality of the received data and generating a busy signal and an idle signal in response to the detected quality of the received data. The communication terminal communicates the idle signal in the transmit data when the detected quality of the received data is below a first threshold value. The communication terminal communicates the busy signal in the transmit data when the detected quality of the received data is equal to or above the first threshold value. Also, the communication terminal communicates the idle signal in the transmit data when the detected quality of the received data is above a second threshold value and the communication of the transmit data is completed.

The objects of the invention may be further achieved in whole or in part by a communication system, including a variable power transmission means for communicating transmit data from a first terminal to a second terminal; a receiving means for communicating receive data from the second terminal to the first terminal; and a signal detection means for detecting a busy signal and an idle signal within the receive data. The signal detection means controls the variable power transmission means' power output, transmission timing, and ability to complete a communication of the transmit data in response to the busy and idle signals generated by the second terminal and detected by the first terminal.

The objects of the invention may be further achieved in whole or in part by a communication method. The method includes communicating transmit data from a first terminal to a second terminal, communicating receive data from the second terminal to the first terminal, detecting a busy signal and an idle signal within the receive data, and controlling a power output, a transmission timing, and an ability to complete the communication of the transmit data in response to the busy and idle signals generated by the second terminal and detected by the first terminal.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 3:
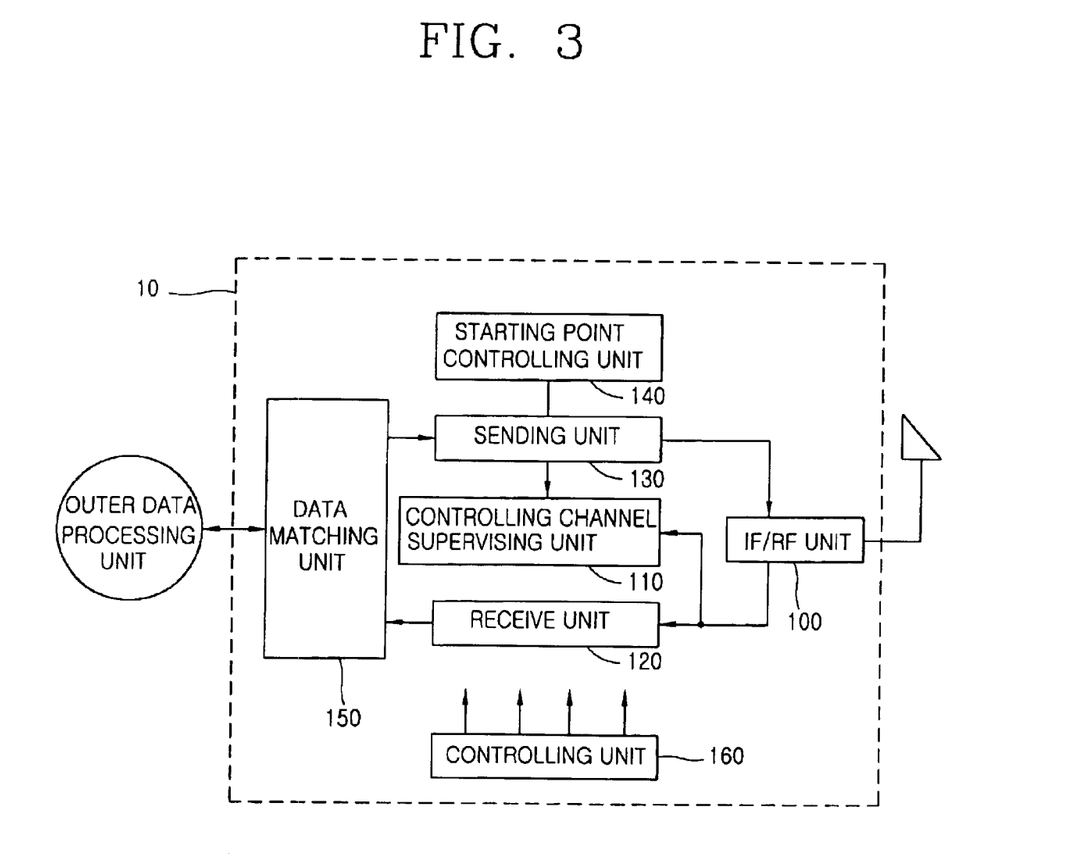
FIG. 3 illustrates a block diagram showing a terminal apparatus according to the present invention.

FIG. 3 is a block diagram showing a terminal 10 apparatus according to the present invention. The terminal 10 has an Intermediate Frequency/Radio Frequency (IF/RF) unit 100 that changes a radio frequency signal transmitted from the base station 20 into a baseband signal and transmits the baseband signal to a receive unit 120. Additionally, the IF/RF unit 100 changes a baseband signal from the sending unit 130 into a radio frequency signal. A receive unit 120 extracts a data signal from the transmitted baseband signal and applies the extracted signal to a data matching unit 150. A data matching unit 150 matches signals inputted/outputted between the terminal 10 and an outer data processing device, to change the signal outputted from the receive unit 120 to be used in the outer data processing device and change the signal outputted from the outer data processing device to be used in the terminal 10. A controlling channel supervising unit 110 controls the transmission electric power of the terminal 10, by extracting a controlling signal from the baseband signal transmitted from the IF/RF unit 100 to the receive unit 120, and supervises the channel occupying status. A starting point controlling unit 140 allocates sequential starting points to the packet data in case the packet data is transmitted normally and allocates a random re-transmitting point to the packet data transmitted later, in case the packet data is not initially transmitted normally, due to a transmission error. A sending unit 130 outputs the data applied from the data matching unit 150 to the IF/RF unit 100. A controlling unit 160 controls and supervises the respective devices 100, 110, 120, 130, 140, and 150.

Figure 4:
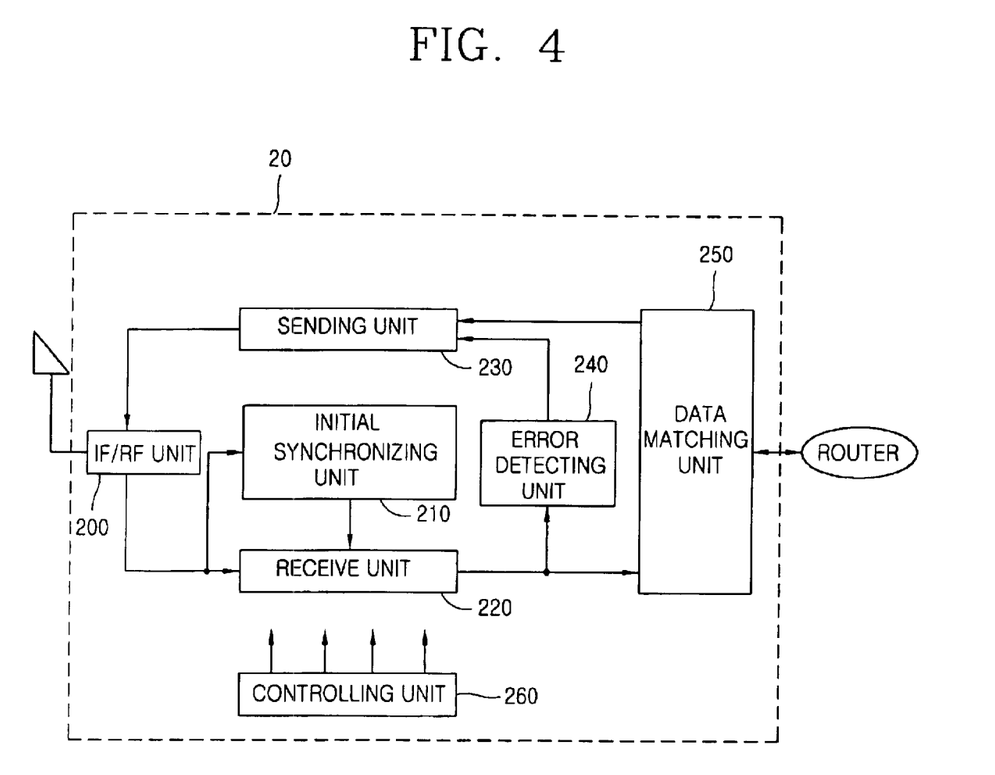
FIG. 4 illustrates a block diagram showing a base station apparatus according to the present invention.

FIG. 4 is a block diagram showing a base station 20 according to the present invention. The base station 20 has an IF/RF unit 200 that transmits a radio frequency signal received from the terminal 10 to a receive unit 220, after changing it into baseband signal. Additionally, the IF/RF unit 200 changes the baseband signal received from the sending unit 230 for transmission to the terminal 10 into a radio frequency signal. A receive unit 220 extracts a data signal from the baseband signal transmitted from the IF/RF unit 200 and applies the extracted signal to a data matching unit 250. An initial synchronizing unit 210 detects the phasing synchronization of the baseband signal data transmitted from the IF/RF unit 200 to the receive unit 220 and outputs it to the receive unit 220, to help the receive unit 220 rapidly detect the data. Additionally, the initial synchronizing unit 210 generates a controlling signal by measuring and analyzing the transmission electric power of the terminal 10 and applies the electric power to a sending unit 230. A data matching unit 250 matches the signals inputted/outputted between the base station 20 and an outer data processing unit (i.e., a router). The data matching unit 250 changes the signal outputted from the receive unit 220, so that it may be used in the outer data processing unit, and changes the signal outputted from the outer data processing unit so that it may be used in the base station 20. An error detecting unit 240 detects an error in the transmitted data by extracting a Cyclic Redundancy Check (CRC) unit from the data signal outputted from the receive unit 220. A sending unit 230 outputs the data applied from the data matching unit 250 to the IF/RF unit 200. A controlling unit 260 controls and supervises the respective devices 200, 210, 220, 230, 240, and 250.

Figure 9:
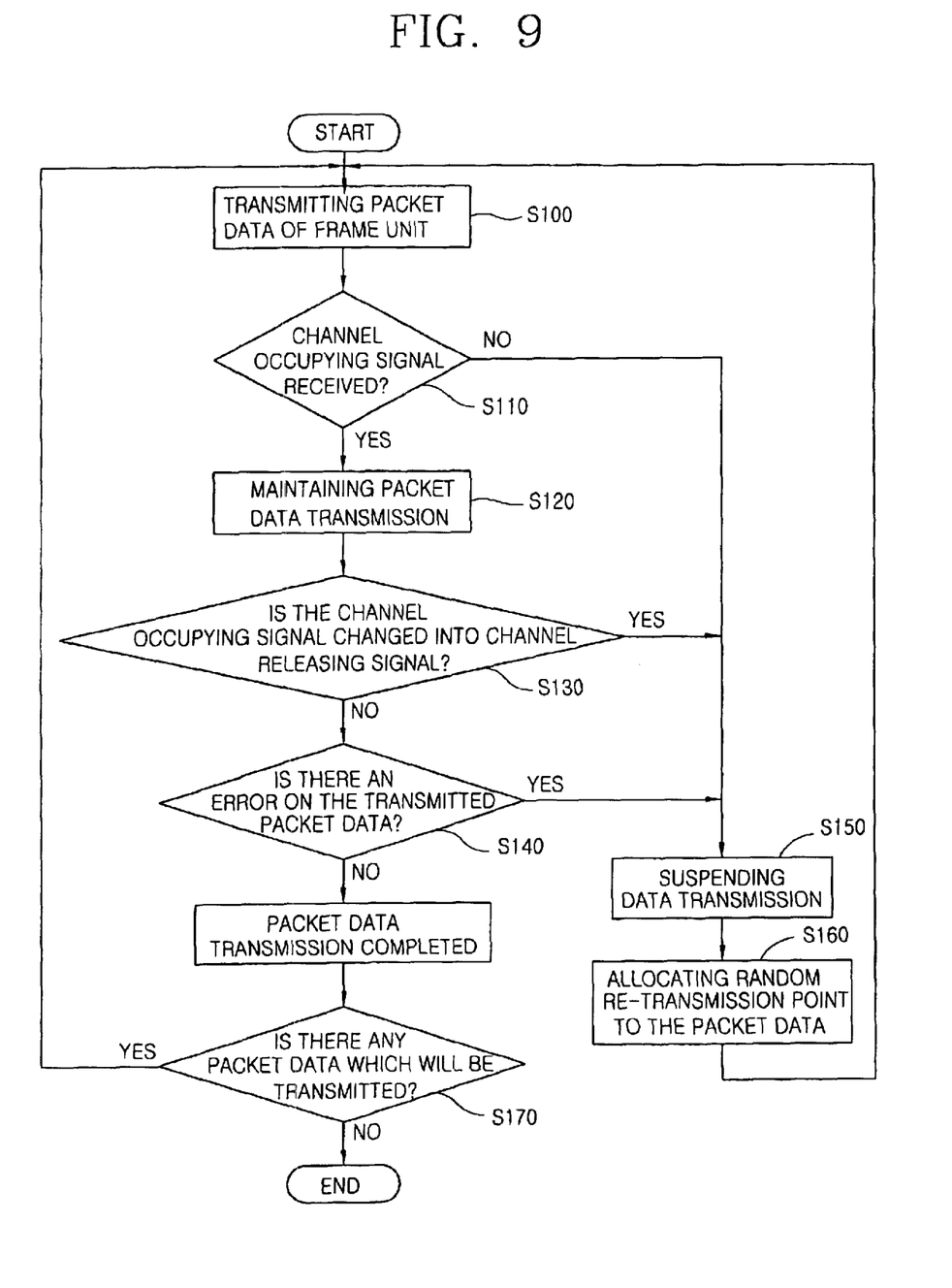
FIG. 9 illustrates a flow chart showing a transmission of packet data according to the present invention.

FIG. 9 is a flow chart showing a transmission of the packet data according to the present invention. The transmission of the packet data includes transmitting packet data of a frame unit to the base station 20 (S100); receiving a response signal for the packet data from the base station 20 (S110); maintaining the transmission of the packet data if the response signal is a channel occupying signal (S120); identifying whether the channel occupying signal is transmitted, while transmitting the packet data (S130); identifying whether an error is generated on the transmitted packet data (S140); and identifying whether there is data to be transmitted, if an error is not generated on the packet data (S170).

If the response signal of step S110 is not the channel occupying signal, the terminal 10 stops the packet data transmission process (S150). Then, the terminal 10 changes the transmission starting point using a randomizing method and feeds back the changed starting point to the above step S100 (S110, S150, and S160).

During the transmission of the packet data (S120), if the terminal 10 receives a channel occupying release signal from the base station 20, the terminal stops the data transmission process and changes the transmission starting point using a randomizing method and feeds back the changed starting point to step S100 (S130, S150, and S160).

In addition, as a result of the error identifying process (S140), if there is an error, the terminal 10 stops the transmission process and changes the retransmission starting point using a randomizing method and feeds back the changed starting point to step S100 (S140, S150, and S160).

The packet data transmission apparatus and method according to the present invention will be described in more detail as follows.

The terminal 10 is inputted data from an outer data processing device such as a computer, through the data matching unit 150, and outputs it to the sending unit 130. The sending unit 130 generates packet data of a frame unit by adding the needed controlling signal to the data transmitted from the data matching unit 150. The generated packet data is a baseband signal and includes a preamble unit, a data unit, a CRC unit, and a postamble unit.

The sending unit 130 outputs the generated packet data to the IF/RF unit 100 and the IF/RF unit 100 changes the inputted packet data into a radio frequency signal. In addition, the changed radio frequency signal is transmitted to the base station 20 through the data channel in an up link. At that time, the starting point controlling unit 140 allocates the packet data to the data channel in the up link.

When the packet data is transmitted normally to the base station 20, that is, when the base station 20 perceives the data transmission from the terminal 10, the base station 20 generates a channel occupying signal (hereinafter, referred to as a 'busy signal') by acquiring synchronization and allocating channels. In addition, the base station 20 transmits the busy signal to the terminal 10 through the controlling channel in a down link. On the other hand, the terminal 10 identifies whether or not the busy signal of the base station 20 is transmitted at a certain time point ($\tau_2$ and $\tau_5$) after a certain propagation delay time from the time when the packet data is transmitted (S110).

As a result of the above identification, if the busy signal is not transmitted from the base station 20, that is, the base station 20 does not perceive the packet data transmission from the terminal 10 because of some reason, such as a weak transmission electric power, the terminal 10 immediately stops the data transmission and is allocated a random re-transmission time point from the starting point controlling unit 140 (S160). Thereafter, the terminal 10 transmission process feeds back to the above step S100 and the terminal 10 tries to re-transmit the packet data (S130, S150, and S160).

If the transmission of the packet data is not stopped in step S150, the CRC unit and the postamble unit will be transmitted behind the preamble unit. This is because the terminal 10 transmits the packet data in a frame unit (preamble unit+data unit+CRC unit+postamble unit) from the step of accessing the base station 20. The terminal 10 does not transmit an additional and separate preamble solely for the purpose of accessing the base station 20.

When the terminal 10 receives a busy signal from the base station 20, the terminal 10 transmits the other parts (the data unit, the CRC unit, and the postamble unit) of the packet data (S120) and identifies whether or not the busy signal is transmitted from the base station 20 continuously (S130). In addition, the identification of the busy signal of the base station 20 is performed continuously during the transmission processes of the data. The terminal 10 performs the continuous identification to determine whether there is a data transmission problem, which may be caused by an abnormal status of the channel.

As a result of the identification (S130), if a channel occupying release signal (hereinafter, referred to as an 'idle signal') is transmitted from the base station 20, the terminal 10 stops the transmission of the data (S150) and is allocated a random re-transmission point by the starting point controlling unit 140 (S160). Thereafter, the method feeds back to step S100. Then, the terminal tries to re-transmit the packet data.

When the base station 20 receives all of the data unit and the CRC unit in the frame transmitted from the terminal 10, the error detecting unit 240 starts an error detecting process using the CRC unit. If there is no error in the transmitted packet data, the initial synchronizing unit 210 is controlled by the controlling unit 260. In addition, the initial synchronizing unit 210 analyzes the transmission electric power of the terminal 10, records a reference electric power, and establishes an electric power compensation value according to the transmitted electric power. Also, the base station 20 changes the busy signal into the idle signal at the time point when the packet data are all transmitted ($t_7$' of FIG. 8), that is, when the postamble units of the packet data are all transmitted. Thereafter, the base station 20 transmits the idle signal to the terminal 10.

If there is an error in the transmitted packet data, the base station 20 continuously transmits the busy signal after the packet data are all transmitted. The terminal 10 identifies whether or not the busy signal is transmitted from the base station 20 at the time points $t_7$ and $t_7$' (see FIGS. 7 and 8), when the transmission of the postamble is completed, and at the time points $t_8$ and $t_8$' after the propagation delay time has passed (S140). In addition, if the busy signal is transmitted, the terminal 10 judges that there is an error in the process of CRC identification and immediately stops the data transmission. And then, the terminal is allocated a random re-transmission point from the starting point controlling unit 140 (S160) and the process feeds back to step S100 (S140, S150, and S160). In addition the terminal tries to re-transmit the packet data.

Figure 7:
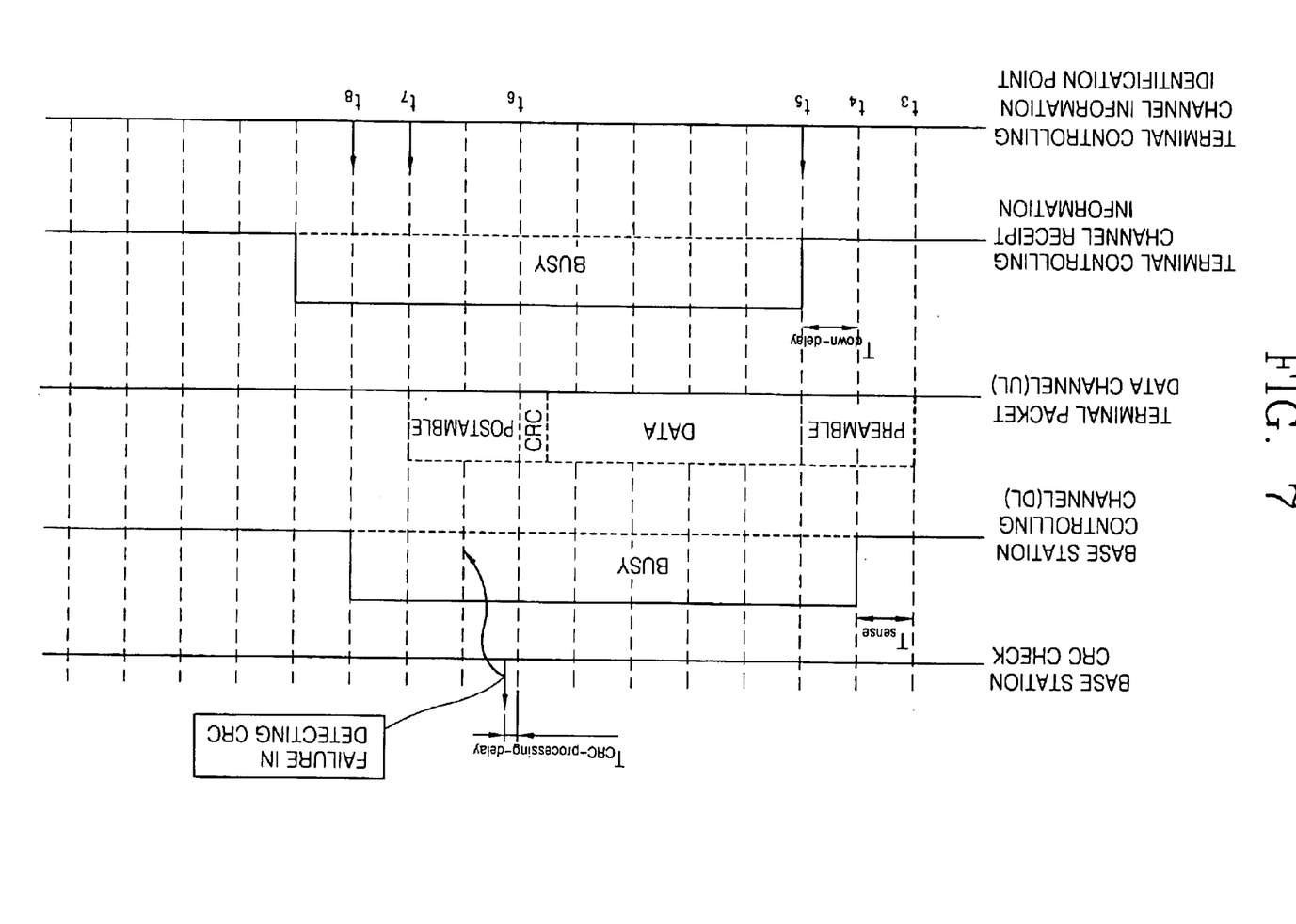
FIG. 7 illustrates a timing view showing a status that an error is detected by a circular repetition examination.
Figure 8:
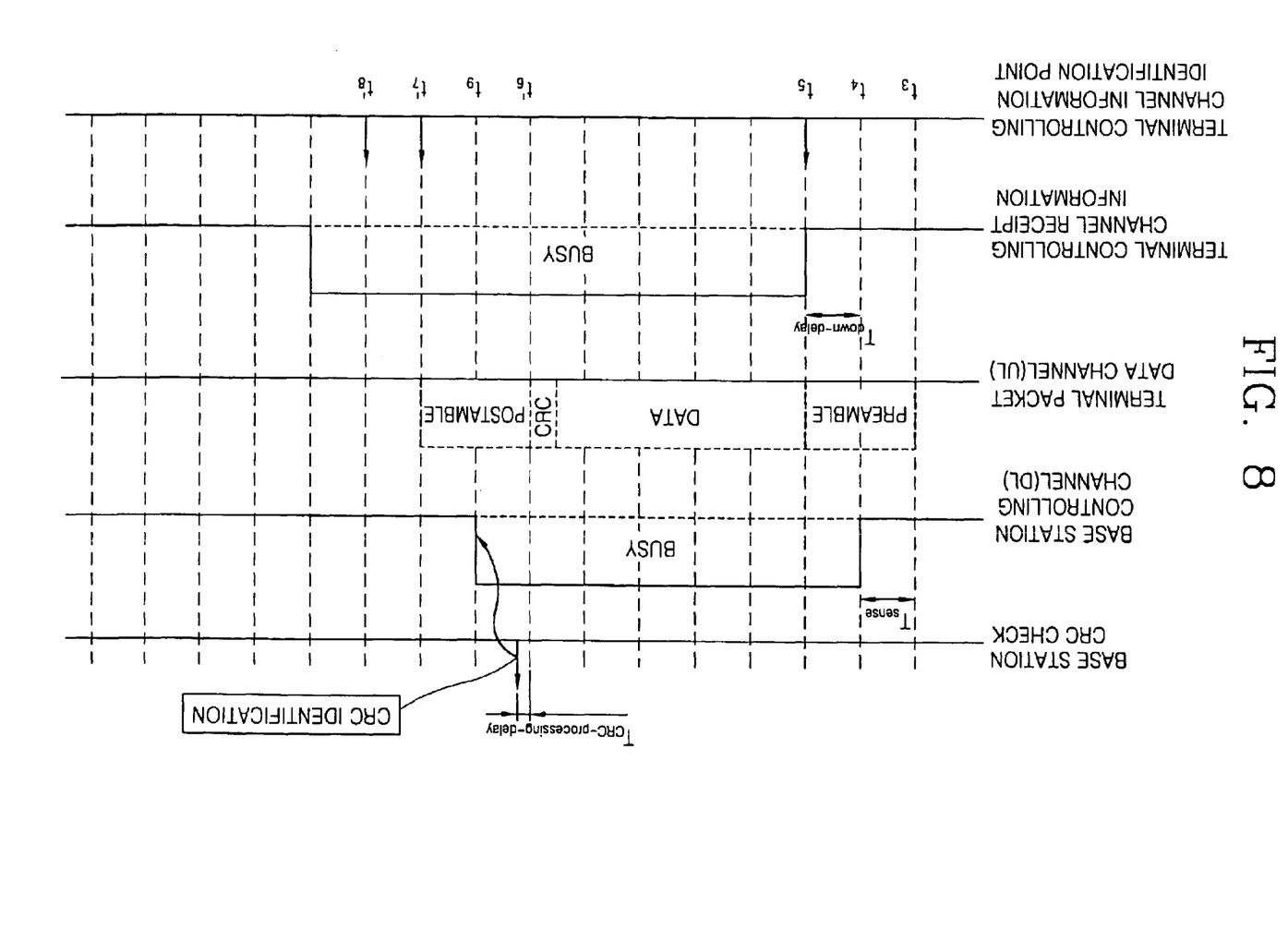
FIG. 8 illustrates a timing view showing a status that no error is detected by a circular repetition examination.

If the busy signal is not transmitted at the time points $t_7$ and $t_7$', and $t_8$ and $t_8$', the terminal 10 judges that there is no error in the packet data transmitted to the base station 20 and is allocated a sequential transmission point when the next data are transmitted. Also, the terminal judges whether there are data which will be transmitted (S170) and feeds back to step S100.

Figure 5:
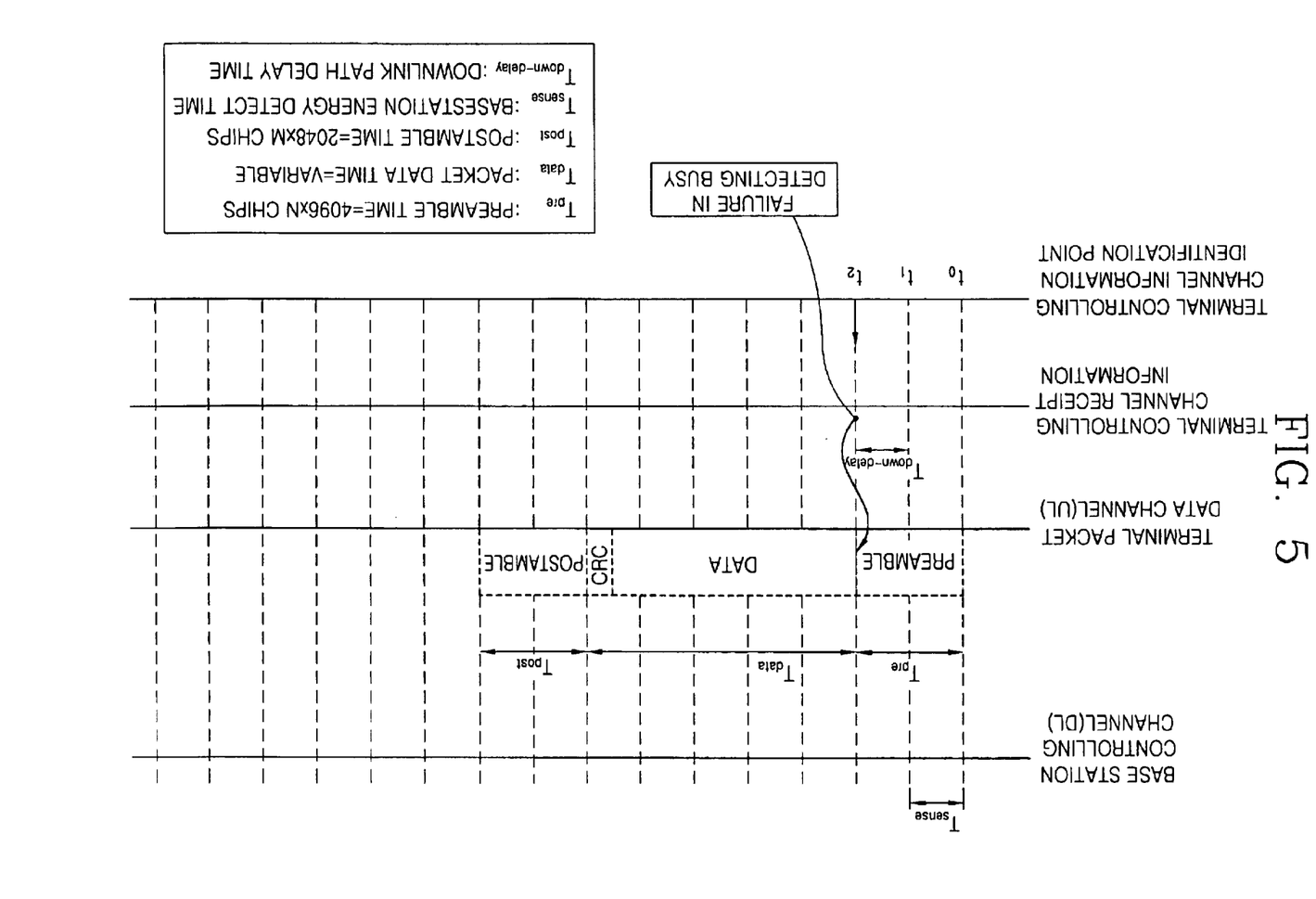
FIG. 5 illustrates a timing view showing a failure of the channel occupying signal according to the present invention.

FIG. 5 is a timing view showing a failed state of the channel occupying signal. The data transmission is suspended because the data transmission of the terminal 10 is not perceived by the base station 20, due to the weak transmission electric power. The above process will be described in more detail as follows.

The terminal 10 transmits packet data of a frame unit to the base station 20 through the data channel of the up link, beginning at time $t_0$. If the packet data is transmitted normally, the packet data arrives at the base station 20 at a time point $t_1$, which occurs a period of time after time $t_0$. The period of time expiring between $t_0$ and $t_1$ is determined by the propagation delay time. Thereafter, the packet data is synchronized and the communication between the terminal 10 and the base station 20 is allocated a number of channels. And then the terminal 10 detects the busy signal through the controlling channel of the down link at a time point $t_2$, which occurs a period of time after time $t_1$ determined by the propagation delay time. However, as shown in FIG. 5, the strength of the transmission electric power of the terminal 10 is not enough to make the base station 20 detect the data transmission by the terminal 10. Therefore, the base station generates an idle signal at time point $t_2$ after the packet data is transmitted.

If the idle signal is detected by terminal 10 at time point $t_2$, it means that the base station 20 can not perceive the data transmission by the terminal 10. Accordingly, the terminal 10 stops the data transmission and feeds back to step S100, after being allocated a random re-transmission point from the starting point controlling unit 140 (S110, S150, and S160).

The idle signal of the base station 20, which is received through the controlling channel of the down link, is detected and analyzed by the controlling channel supervising unit 110. The result of the analysis is transmitted to the sending unit 130 and, therefore, the data transmission is immediately suspended.

Figure 6:
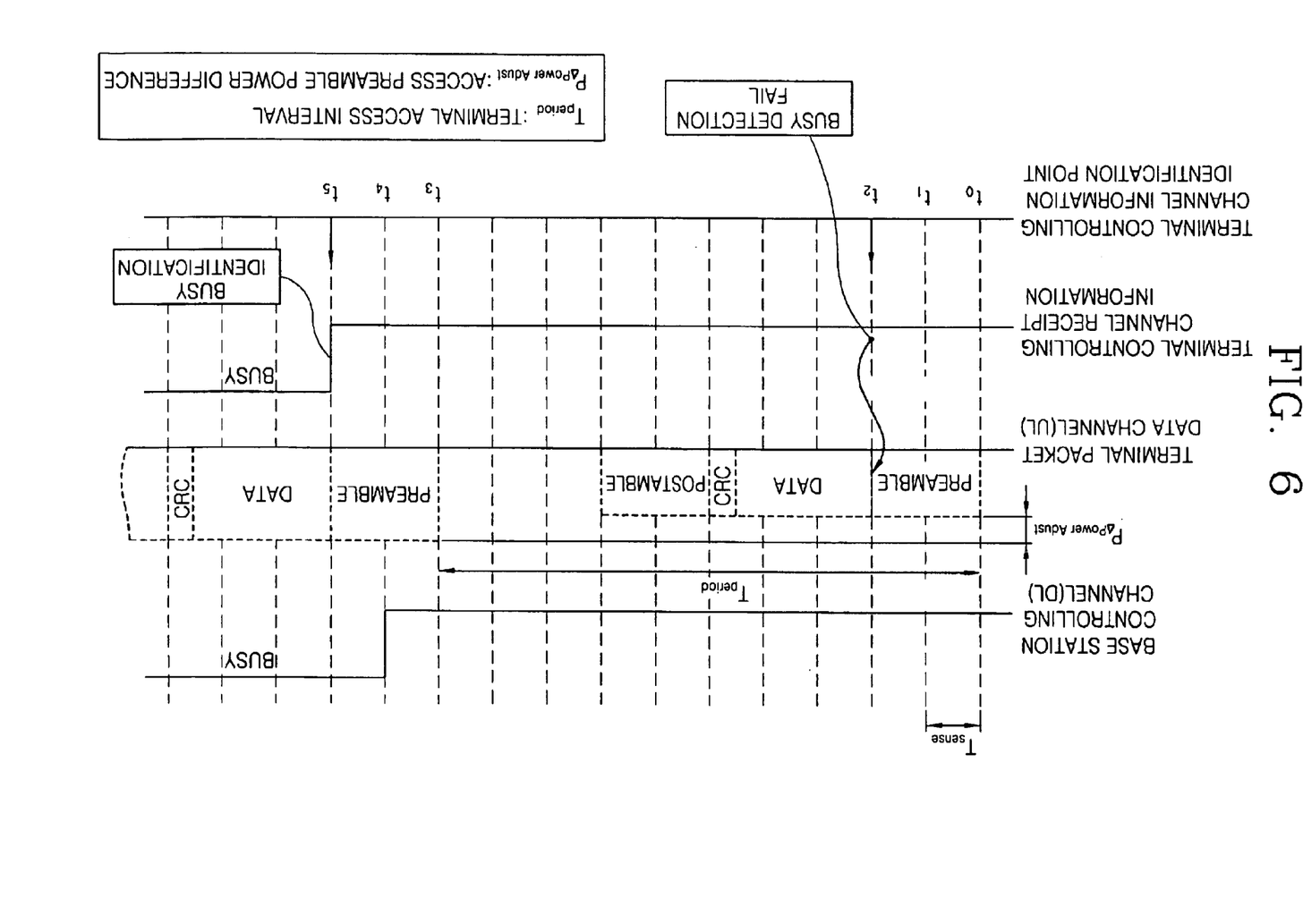
FIG. 6 illustrates a timing view showing a channel occupying signal success, according to the present invention.

FIG. 6 is a timing view showing a successful state of the channel occupying signal according to the present invention. Additionally, FIG. 6 shows a process of re-transmitting the packet data with a higher transmission electric power after a previous transmission failure and a process of receiving the busy signal from the base station 20 after the re-transmission is successful. The above processes will be described in more detail as follows.

The terminal 10 increases the transmission electric power level and the packet data is re-transmitted at random time point. If the re-transmission of the packet data is made normally, the packet data transmitted from the terminal 10 at time $t_3$ arrives at the base station 20 at time $t_4$, after a propagation delay time equal to $t_4-t_3$. And then, the packet data is synchronized, the packet data is allocated a channel, and the busy signal of the base station 20 is transmitted to the terminal 10 through the controlling channel of the down link, at time $t_4$. The busy signal is received by the terminal 10 at $t_5$, which occurs a period of time equal to the propagation delay time after time $t_4$.

In addition, after the packet data of the terminal 10 is transmitted, the terminal 10 is able to detect the busy signal of the base station 20 through the down link controlling channel at time $t_5$. Therefore, the terminal 10 transmits the remaining parts of the data frame (data unit, CRC unit, and postamble unit) (S140).

FIG. 7 is a timing view showing an error which is detected during the CRC, according to the present invention. When the terminal transmits the packet data at time $t_3$ through the data channel of the up link, the base station 20 receives the packet data signal after a propagation delay time has passed. And then, the base station 20 transmits the busy signal to the terminal 10 beginning at time $t_4$, while the packet data is transmitted.

The frame data transmitted from the terminal 10 is transmitted in the order of the preamble unit, the data unit, the CRC unit, and the postamble unit. In addition, when the base station 20 completely receives the data unit, the base station 20 performs an error detecting process using the error detecting unit 240, while the CRC unit is transmitted. If an error is detected after the CRC is received ($t_6$), the base station 20 continually transmits the busy signal until data having no errors are transmitted from the terminal 10.

The terminal identifies whether or not the base station 20 continually transmits the busy signal at the time point $t_7$, when the transmission of the packet data is complete, and when a propagation delay time after time $t_7$ has passed ($t_8$). And if the busy signal is detected at the point $t_8$, the terminal judges that there is an error on the transmitted packet data.

FIG. 8 is a timing view showing a state that no error is detected in the CRC, according to the present invention. When the terminal 10 transmits the packet data at time $t_3$ through the data channel of the up link, the base station 20 receives the packet data signal at time $t_4$, after a propagation delay time has passed. Thereafter, the base station 20 transmits the busy signal to the terminal 10 beginning at time $t_4$, while the packet data is received.

If the base station 20 judges that there is no error on the transmitted packet data, by performing an error detecting process at time $t_6$, the base station 20 changes the busy signal into the idle signal and transmits the idle signal to the terminal 10 through the controlling channel of the down link ($t_9$).

In addition, when the terminal 10 identifies that the busy signal is changed into the idle signal at the point when the transmission of the packet data is completed ($t_7'$) and at the point when a propagation delay time has passed ($t_8'$), the terminal 10 judges that the packet data is transmitted with no error.

The circuit operation of the base station 20 will be described as follows with reference to FIGS. 7 and 8. The radio frequency signal sent from the terminal 10 is collected by an antenna of the base station 20 and changed into baseband signal through the IF/RF unit 200. Then, the changed signal is outputted to the receive unit 220.

The initial synchronizing unit 210 detects a phase of the signal outputted from the IF/RF unit 200 to the receive unit 220 and outputs the detected phase signal to the receive unit 220 to help prompt data detection by the receive unit. Also, the initial synchronizing 210 is controlled by the controlling unit 260 to detect and analyze the CRC signal, whereby it judges whether there is an error on the transmitted data.

When there is no error in the transmitted data, the sending unit 230 changes the busy signal into the idle signal and transmits the idle signal to the terminal 10 through the controlling channel of the down link. If there is an error in the transmitted data, the sending unit 230 continually transmits the busy signal until data having no errors are transmitted from the terminal 10.

As described above, according to the present invention, the pre-processing time can be reduced to less than one-fifth of the background art because the terminal 10 transmits the packet data of a frame unit (preamble unit+data unit+CRC unit+postamble unit) at the step of accessing the base station 20, without an additional preamble transmission solely for accessing the base station 20. The present invention differs from the background art which uses a closed loop power control method. In the background art, an access preamble, a CD preamble, and an overhead signal such as a packet preamble are transmitted before the packet data are transmitted. With the present invention, the data can be used within a propagation delay time and processing time of the circuit after being transmitted. By minimizing the overhead time, more data can be transmitted in the same time as that of the background art.

Also, the data transmission time is increased when the packet data is re-transmitted because of an error. An immediate re-transmission can be made by identifying whether or not the busy signal is transmitted. The re-transmission process is prepared by suspending the data transmission, upon identifying an error, and allocating a new channel starting point. Thereby, the data transmission efficiency can be increased.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A communication terminal, comprising:
   an IF/RF unit that changes a radio frequency signal of received data into a received baseband signal and that changes a baseband signal of transmit data to a radio frequency signal for transmission within a packet;
   a receive unit detects a data signal from the received baseband signal outputted by the IF/RF unit;
   a data matching unit that receives the data signal from the receive unit and matches data communicated between the communication terminal and an outer processing device;
   a controlling channel supervising unit that controls a transmission electric power of the communication terminal, by detecting a controlling signal within the received baseband signal, and supervises a channel occupying status;

a starting point controlling unit that decides a transmission point of the transmit data and generates a corresponding transmission controlling signal; and a sending unit that outputs the transmit data, which is received from the data matching unit, to the IF/RF unit based on the corresponding transmission controlling signal, wherein the communication terminal does not transmit a separate access preamble for accessing a base station in addition to a preamble contained within a data packet.

2. The communication terminal of claim 1, wherein the starting point controlling unit randomly sets a re-transmission point of the packet when a prior communication of the packet to a base station fails.

3. The communication terminal of claim 1, wherein the communication terminal transmits the transmit data in the packet with a preamble unit, a CRC unit, and a postamble unit.

4. A communication terminal, comprising:

an IF/RF unit that changes a radio frequency signal of received data into a received baseband signal and that changes a baseband signal of transmit data to a radio frequency signal for transmission within a packet;

a receive unit detects a data signal from the received baseband signal outputted by the IF/RF unit;

a data matching unit that receives the data signal from the receive unit and matches data communicated between the communication terminal and an outer processing device;

a controlling channel supervising unit that controls a transmission electric power of the communication terminal, by detecting a controlling signal within the received baseband signal, and supervises a channel occupying status;

a starting point controlling unit that decides a transmission point of the transmit data and generates a corresponding transmission controlling signal; and a sending unit that outputs the transmit data, which is received from the data matching unit, to the IF/RF unit based on the corresponding transmission controlling signal, wherein the communication terminal does not transmit a separate access preamble for accessing a base station in addition to a preamble contained within the packet, and wherein the controlling channel supervising unit judges that a base station failed to receive the transmit data, if a channel occupying signal of the controlling signal communicated by the base station is detected at both a point of time when the transmission of the packet is complete and when a propagation delay time between the communication terminal and the base station has expired after the packet transmission is complete.

5. The communication terminal of claim 4, wherein the sending unit suspends the transmission of the packet upon identifying the failure and the packet is allocated a random re-transmission point by the starting point controlling unit.

6. A communication terminal, comprising:

an IF/RF unit that changes a radio frequency signal of received data into a received baseband signal and that changes a baseband signal of transmit data to a radio frequency signal for transmission within a packet;

a receive unit detects a data signal from the received baseband signal outputted by the IF/RF unit;

a data matching unit that receives the data signal from the receive unit and matches data communicated between the communication terminal and an outer processing device;

an error detecting unit that checks for an error signal in the received baseband signal inputted to the receive unit and generates a corresponding error controlling signal; and a sending unit that outputs the transmit data, which is received from the data matching unit, to the IF/RF unit based on the corresponding error controlling signal, wherein the communication terminal does not transmit a separate access preamble for accessing a base station in addition to a preamble contained within a data packet.

7. The communication terminal of claim 6, wherein the communication terminal sets a re-transmission point randomly if a communication of the packet to a base station fails.

8. The communication terminal of claim 6, wherein the communication terminal transmits the transmit data in the packet with a preamble unit, a CRC unit, and a postamble unit.

9. A communication terminal, comprising:

an IF/RF unit that changes a radio frequency signal of received data into a received baseband signal and that changes a baseband signal of transmit data to a radio frequency signal for transmission within a packet;

a receive unit detects a data signal from the received baseband signal outputted by the IF/RF unit;

a data matching unit that receives the data signal from the receive unit and matches data communicated between the communication terminal and an outer processing device;

an error detecting unit that checks for an error signal in the received baseband signal inputted to the receive unit and generates a corresponding error controlling signal; and a sending unit that outputs the transmit data, which is received from the data matching unit to the IF/RF unit based on the corresponding error controlling signal, wherein the communication terminal does not transmit a separate access preamble for accessing a base station in addition to a preamble contained within a packet, and wherein the error detecting unit maintains a channel occupying status during and after the receipt of the packet by a base station, if the base station communicates the error signal to the communication terminal.

10. A communication terminal, comprising:

an IF/RF unit that changes a radio frequency signal of received data into a received baseband signal and that changes a baseband signal of transmit data to a radio frequency signal for transmission within a packet;

a receive unit detects a data signal from the received baseband signal outputted by the IF/RF unit;

a data matching unit that receives the data signal from the receive unit and matches data communicated between the communication terminal and an outer processing;

an error detecting unit that checks for an error signal in the received baseband signal inputted to the receive unit and generates a corresponding error controlling signal; and a sending unit that outputs the transmit data, which is received from the data matching unit, to the IF/RF unit based on the corresponding error controlling signal, wherein the communication terminal does not transmit a separate access preamble for accessing a base station in addition to a preamble contained within a packet, and wherein the communication terminal judges that a base station failed to receive the transmit data if a channel occupying signal of the received baseband signal communicated by the base station is detected at both a point of time when the transmission of the packet is complete and when a propagation delay time between the communication terminal and the base station has expired after the packet transmission is complete.

11. A method of data transmission, comprising:

communicating data within a packet frame unit from a terminal to a base station without transmitting a separate access preamble for accessing the base station in addition to a preamble contained within the packet frame unit;

transmitting a channel occupying signal from the base station to the terminal when data transmission from the terminal is perceived by the base station;

continuing the communication of the packet data, while the channel occupying signal is active;

identifying whether the base station receives the communicated packet data; and ending a process for communicating the packet data if the base station receives the communicated packet data.

12. The method of claim 11, further comprising suspending the packet data communication and restarting the communication of the packet data to the base station, if the base station fails to perceive the packet data communication.

13. The method of claim 11, further comprising suspending the packet data communication and restarting the communication of the packet data to the base station if the base station fails to receive the communicated packet data.

14. The method of claim 13, wherein the base station maintains the active channel occupying signal for the terminal until the packet data is successfully communicated to the base station.

15. The method of claim 13, wherein the terminal randomly sets a re-transmission point for restarting the communication of the packet data.

16. The method of claim 11, wherein the packet frame unit further comprises a preamble unit, a CRC unit, and a postamble unit.

17. A method of data transmission, comprising:

communicating data within a packet frame unit from a terminal to a base station without transmitting a separate access preamble for accessing the base station in addition to a preamble contained within the packet frame unit;

transmitting a channel occupying signal from the base station to the terminal when data transmission from the terminal is perceived by the base station;

continuing the communication of the packet data, while the channel occupying signal is active;

identifying whether the base station receives the communicated packet data; and ending a process for communicating the packet data if the base station receives the communicated packet data, wherein the terminal identifies whether an allocated communication channel is released during the packet data communication and then suspends the packet data communication and restarts the communication of the packet data to the base station, if the allocated communication channel is released.

18. A method of data transmission, comprising:

communicating data within a packet frame unit from a terminal to a base station without transmitting a separate access preamble for accessing the base station in addition to a preamble contained within the packet frame unit;

transmitting a channel occupying signal from the base station to the terminal when data transmission from the terminal is perceived by the base station;

continuing the communication of the packet data, while the channel occupying signal is active;

identifying whether the base station receives the communicated packet data; and ending a process for communicating the packet data if the base station receives the communicated packet data, wherein the terminal judges that the base station failed to receive the packet data, if the channel occupying signal communicated by the base station is detected at both a point of time when a transmission of the packet data is complete and when a propagation delay time between the terminal and the base station has expired after the packet data transmission is complete.

19. A communication terminal, comprising:

a variable power transmission means for communicating transmit data;

a receiving means for communicating received data; and a signal detection means for detecting a busy signal and an idle signal within the received data, wherein the signal detection means controls the variable power transmission means' power output, transmission timing, and ability to complete a communication of the transmit data, in response to the detected busy and idle signals, and the communication terminal accesses a base station without transmitting a separate access preamble in addition to a preamble contained within a data packet.

20. The communication terminal of claim 19, wherein the variable power transmission means completes a current attempt to communicate the transmit data, when the signal detection means detects a transition from the idle signal to the busy signal and a subsequent transition from the busy signal to the idle signal during the current attempt to communicate the transmit data.

21. A communication terminal, comprising:

a variable power transmission means for communicating transmit data;

a receiving means for communicating received data; and a signal detection means for detecting a busy signal and an idle signal within the received data, wherein the signal detection means controls the variable power transmission means' power output, transmission timing, and ability to complete a communication of the transmit data, in response to the detected busy and idle signals, and wherein the communication terminal does not transmit a separate access preamble for accessing a base station in addition to a preamble contained within the packet, and wherein the variable power transmission means disrupts a current attempt to communicate the transmit data, varies the power output, re-establishes the transmission timing in a substantially random way for a subsequent attempt to communicate the transmit data, and subsequently attempts to communicate the transmit data, when the signal detection means fails to detect a transition from the idle signal to the busy signal during the current attempt to communicate the transmit data.

22. A communication terminal, comprising:

a variable power transmission means for communicating transmit data;

a receiving means for communicating received data; and a signal detection means for detecting a busy signal and an idle signal within the received data, wherein the signal detection means controls the variable power transmission means' power output, transmission timing, and ability to complete a communication of the transmit data, in response to the detected busy and idle signals, and wherein the communication terminal does not transmit a separate access preamble for accessing a base station in addition to a preamble contained within the packet, and wherein the variable power transmission means disrupts a current attempt to communicate the transmit data, re-establishes the transmission timing in a substantially random way for a subsequent attempt to communicate the transmit data, and subsequently attempts to communicate the transmit data, when the signal detection means fails to detect a transition from the busy signal to the idle signal during the current attempt to communicate the transmit data.

23. A communication terminal, comprising:

a transmission means for communicating transmit data;

a receiving means for communicating received data; and a signal detection means for detecting a quality of the received data and generating a busy signal and an idle signal in response to the detected quality of the received data, wherein the transmission means communicates the idle signal in the transmit data when the detected quality of the received data is below a first threshold value, the transmission means communicates the busy signal in the transmit data when the detected quality of the received data is equal to or above the first threshold value, and the transmission means communicates the idle signal in the transmit data when the detected quality of the received data is above a second threshold value and the communication of the transmit data is completed.

24. A communication system, comprising:

a variable power transmission means for communicating transmit data from a first terminal to a second terminal;

a receiving means for communicating receive data from the second terminal to the first terminal; and a signal detection means for detecting a busy signal and an idle signal within the receive data, wherein the signal detection means controls the variable power transmission means' power output, transmission timing, and ability to complete a communication of the transmit data in response to the busy and idle signals generated by the second terminal and detected by the first terminal, and the communication terminal accesses a base station without transmitting a separate access preamble in addition to a preamble contained within a data packet.

25. A communication method, comprising communicating transmit data from a first terminal to a second terminal without transmitting a separate access preamble for accessing the base station in addition to a preamble contained within a packet frame unit;

communicating receive data from the second terminal to the first terminal;

detecting a busy signal and an idle signal within the receive data; and controlling a power output, a transmission timing, and an ability to complete the communication of the transmit data in response to the busy and idle signals generated by the second terminal and detected by the first terminal.

26. The communication method of claim 25, further comprising completing a current attempt to communicate the transmit data, when a transition from the idle signal to the busy signal and a subsequent transition from the busy signal to the idle signal are detected during the current attempt to communicate the transmit data.

27. A communication method, comprising:

communicating transmit data from a first terminal to a second terminal without transmitting a separate access preamble for accessing the base station in addition to a preamble contained within the packet frame unit;

communicating receive data from the second terminal to the first terminal;

detecting a busy signal and an idle signal within the receive data;

controlling a power output, a transmission timing, and an ability to complete the communication of the transmit data in response to the busy and idle signals generated by the second terminal and detected by the first terminal; and varying the power output, re-establishing the transmission timing in a substantially random way for a subsequent attempt to communicate the transmit data, and subsequently attempting to communicate the transmit data, when a transition from the idle signal to the busy signal is not detected during a current attempt to communicate the transmit data.

28. A communication method, comprising:

communicating transmit data from a first terminal to a second terminal without transmitting a separate access preamble for accessing the base station in addition to a preamble contained within the packet frame unit;

communicating receive data from the second terminal to the first terminal;

detecting a busy signal and an idle signal within the receive data;

controlling a power output, a transmission timing, and an ability to complete the communication of the transmit data in response to the busy and idle signals generated by the second terminal and detected by the first terminal; and disrupting a current attempt to communicate the transmit data, re-establishing the transmission timing in a substantially random way for a subsequent attempt to communicate the transmit data, and subsequently attempting to communicate the transmit data, when a transition from the busy signal to the idle signal is not detected during the current attempt to communicate the transmit data.

29. A communication terminal, comprising:

a controlling channel supervising unit that controls a transmission electric power of the communication terminal, by detecting a controlling signal within a received baseband signal, and supervises a channel occupying status, wherein the controlling channel supervising unit judges that a base station failed to receive transmitted data, if a channel occupying signal of the controlling signal communicated by the base station is detected at both a point of time when the transmission of the packet is complete and when a propagation delay time between the communication terminal and the base station has expired after the packet transmission is complete.

30. The communication terminal of claim 29, further comprising:

an IF/RF unit that changes a radio frequency signal of received data into the received baseband signal and that changes a baseband signal of transmit data to a radio frequency signal for transmission within a packet;

a receive unit detects a data signal from the received baseband signal outputted by the IF/RF unit;

a data matching unit that receives the data signal from the receive unit and matches data communicated between the communication terminal and an outer processing device;

a starting point controlling unit that decides a transmission point of the transmit data and generates a corresponding transmission controlling signal; and a sending unit that outputs the transmit data) which is received from the data matching unit, to the IF/RF unit based on the corresponding transmission controlling signal.

31. The communication terminal of claim 30, wherein the starting point controlling unit randomly sets a re-transmission point of the packet when a prior communication of the packet to a base station fails.

32. The communication terminal of claim 29, wherein the communication terminal does not transmit a separate preamble for accessing a base station in addition to a preamble contained within the packet.

33. The communication terminal of claim 29, wherein the communication terminal transmits the transmit data in the packet with a preamble unit, a CRC unit, and a postamble unit.

34. The communication terminal of claim 29, wherein the sending unit suspends the transmission of the packet upon identifying the failure and the packet is allocated a random re-transmission point by the starting point controlling unit.

* * * * *